(12) United States Patent
Ichinose et al.

(10) Patent No.: US 7,937,219 B2
(45) Date of Patent: May 3, 2011

(54) STEERING ASSIST SYSTEM AND VEHICLE MOUNTED WITH THE SAME

(75) Inventors: Masanori Ichinose, Tsukuba (JP); Shingo Nasu, Hitachinaka (JP); Tatsuya Yoshida, Naka (JP)

(73) Assignee: Hitachi, Ltd., Tokyo (JP)

( * ) Notice: Subject to any disclaimer, the term of this patent is extended or adjusted under 35 U.S.C. 154(b) by 592 days.

(21) Appl. No.: 12/103,381

(22) Filed: Apr. 15, 2008

(65) Prior Publication Data

US 2008/0255729 A1 Oct. 16, 2008

(30) Foreign Application Priority Data

Apr. 16, 2007 (JP) ................................ 2007-107023

(51) Int. Cl.
*B60W 30/08* (2006.01)
*G08G 1/16* (2006.01)

(52) U.S. Cl. ............ 701/301; 701/41; 701/70; 340/903; 340/436

(58) Field of Classification Search .................... 701/301
See application file for complete search history.

(56) References Cited

U.S. PATENT DOCUMENTS

| | | | |
|---|---|---|---|
| 6,212,452 B1 | 4/2001 | Shimizu et al. | |
| 6,778,890 B2 * | 8/2004 | Shimakage et al. | 701/41 |
| 7,099,764 B2 * | 8/2006 | Seto et al. | 701/70 |
| 2001/0003810 A1 * | 6/2001 | Shinmura et al. | 701/301 |
| 2002/0156580 A1 * | 10/2002 | Matsuura | 701/301 |
| 2005/0090984 A1 * | 4/2005 | Kobayashi et al. | 701/301 |
| 2005/0203705 A1 * | 9/2005 | Izumi et al. | 701/301 |
| 2005/0267660 A1 | 12/2005 | Fujiwara et al. | |
| 2005/0267683 A1 * | 12/2005 | Fujiwara et al. | 701/301 |
| 2007/0010945 A1 * | 1/2007 | Shoda et al. | 701/301 |
| 2008/0319612 A1 | 12/2008 | Kudo | |

FOREIGN PATENT DOCUMENTS

| | | |
|---|---|---|
| DE | 199 22 284 A1 | 11/1999 |
| DE | 19922284 A1 * | 11/1999 |
| DE | 10 2006 034 254 A1 | 4/2007 |
| DE | 102006034254 A1 * | 4/2007 |
| DE | 10 2008 003 804 A1 | 8/2008 |
| JP | 9-207801 A | 8/1997 |
| JP | 2000-159136 A | 6/2000 |

OTHER PUBLICATIONS

European Search Report dated Mar. 30, 2009 (Eight (8) pages).

* cited by examiner

*Primary Examiner* — Thomas G Black
*Assistant Examiner* — Lin B Olsen
(74) *Attorney, Agent, or Firm* — Crowell & Moring LLP

(57) ABSTRACT

An object of the present invention is to provide a steering assist system capable of showing a driver an appropriate direction of steering operation in advance and correctly, and without impairing safety, and shortening an operation time during collision avoidance, in particular, reducing an idle running time. It is another object of the present invention to provide a vehicle mounted with such a steering assist system. A recommended steering direction determination unit 102 determines a recommended steering direction using measurements of a lateral position taken by an obstacle position measurement unit 101. After a collision determination unit 103 determines that risk of collision is high, a steering assist torque is generated using a first assist torque command value set by a first torque calculation unit 105. After a predetermined period of time after the driver starts steering or the steering assist torque is generated using the first assist torque command value is generated, a steering assist torque is generated using a second assist torque command value set by a second torque calculation unit 106, the second assist torque command value being smaller than the first assist torque command value.

10 Claims, 4 Drawing Sheets

STEERING ASSIST SYSTEM AND VEHICLE MOUNTED WITH THE SAME

BACKGROUND OF THE INVENTION

1. Field of the Invention

The present invention relates in general to steering assist systems for vehicles and vehicles mounted with the same. More particularly, the present invention relates to a steering assist system well adapted for shortening an idle running time produced by an operation lag by a vehicle driver or play in a steering mechanism of a vehicle when prompt steering operations are required for emergency avoidance or the like, and a vehicle mounted with the same.

2. Description of the Related Art

In a situation where there is a risk of collision with obstacles around a vehicle, a known steering assist system is arranged to avoid collision by issuing a warning to and assisting a driver. JP-A-9-207801, for example, discloses a steering assist system that issues a warning by applying torque or vibration to a steering wheel when an operation involving a risk of collision is performed, thereby calling driver's attention. In the steering assist system disclosed in JP-A-9-207801, a degree of risk of collision is found based on a distance between the vehicle to an obstacle and a vehicle speed; a magnitude of the torque or a frequency of the vibration to be applied to the steering wheel is varied according to the degree of risk and steering for avoidance is thereby assisted.

SUMMARY OF THE INVENTION

The steering assist system disclosed in JP-A-9-207801 is capable of showing information on safety of the operation performed for avoidance by the driver, specifically, whether or not a direction in which the steering wheel is turned is appropriate. The steering assist system disclosed in JP-A-9-207801, however, poses a problem in that, because the information cannot be shown to the driver before the operation for avoidance is initiated, sufficient avoidance performance cannot be exhibited if initiation of the steering operation is delayed.

It is an object of the present invention to provide a steering assist system capable of showing the driver the appropriate direction of steering operation in advance and correctly, and without impairing safety, and shortening an operation time during collision avoidance, in particular, reducing an idle running time. It is another object of the present invention to provide a vehicle mounted with such a steering assist system.

(1) To achieve the foregoing object, there is provided a steering assist system that determines a steering direction according to a vehicle running condition and generates an assist torque for a steering operation. The steering assist system comprises an obstacle position measurement means, a collision determination means, a recommended steering direction determination means, a first torque setting means, a second torque setting means, and a selection means. Specifically, the obstacle position measurement means measures a distance from, and a lateral position of, a forward obstacle. The collision determination means determines risk of collision based on measurements of the distance from, and the lateral position of, the forward obstacle taken with the obstacle position measurement means. The recommended steering direction determination means determines a recommended steering direction based on the measurements of the lateral position of the forward obstacle taken with the obstacle position measurement means. The first torque setting means sets a first assist torque command value. The second torque setting means sets a second assist torque command value that is smaller than the first assist torque command value set by the first torque setting means. The selection means selects such that, after the collision determination means determines that the risk of collision is high, a steering assist torque is generated by the first assist torque command value set by the first torque setting means and, after a predetermined period of time elapses after a driver has started steering or the steering assist torque generated by the first assist torque command value has been generated, the steering assist torque is generated by the second assist torque command value set by the second torque setting means.

The foregoing arrangements allow an appropriate direction of steering operation to be shown to a driver in advance and correctly, and without impairing safety, and an operation time during collision avoidance to be shortened, and, in particular, an idle running time to be reduced.

(2) In the foregoing (1), preferably the first torque setting means limits a magnitude of the first assist torque command value to be set thereby such that a change in a direction of travel of a vehicle body falls within a specified range.

(3) In the foregoing (1), preferably, when the selection means changes the first assist torque command value to the second assist torque command value after the lapse of the predetermined period of time, the predetermined period of time is set so as to substantially equal to an idle running time by a human response lag.

(4) In the foregoing (3), preferably the selection means limits the predetermined period of time such that a change in the direction of travel of the vehicle body falls within a specified range.

(5) In the foregoing (1), preferably, the first torque setting means varies the magnitude of the first assist torque command value to be set thereby according to a running speed of the vehicle.

(6) In the foregoing (1), preferably, the first torque setting means varies the magnitude of the first assist torque command value to be set thereby according to a friction coefficient of a road surface on which the vehicle runs.

(7) In the foregoing (1), preferably, the second torque setting means calculates a magnitude of the second assist torque to be set thereby through angular velocity control of a steering angle.

(8) In the foregoing (1), preferably, the steering assist system further comprises a traffic lane recognition means recognizing a traffic lane forward of the vehicle body, and the recommended steering direction determination means corrects the recommended steering direction based on information on a running position within a road of a host vehicle provided by the traffic lane recognition means.

(9) In the foregoing (1), preferably, the steering assist system further comprises an occupant detection means detecting an occupant other than the driver, and the recommended steering direction determination means corrects the recommended steering direction based on whether or not there is an occupant other than the driver as detected by the occupant detection means.

(10) To achieve the foregoing object, there is provided a vehicle having wheels driven by a driving force source and a steering assist system determining a steering direction according to a running condition of the vehicle and generating an assist torque for a steering operation. More specifically, the steering assist system comprises an obstacle position measurement means, a collision determination means, a recommended steering direction determination means, a first torque setting means, a second torque setting means, and a selection means. Specifically, the obstacle position measurement means measures a distance from, and a lateral position of, a forward obstacle. The collision determination means determines risk of collision based on measurements of the distance from, and the lateral position of, the forward obstacle taken with the obstacle position measurement means. The recommended steering direction determination means determines a recommended steering direction based on the measurements of the lateral position of the forward obstacle taken with the obstacle position measurement means. The first torque setting means sets a first assist torque command value. The second torque setting means sets a second assist torque command value that is smaller than the first assist torque command value set by the first torque setting means. The selection means selects such that, after the collision determination means determines that the risk of collision is high, a steering assist torque is generated by the first assist torque command value set by the first torque setting means and, after a predetermined period of time elapses after a driver has started steering or the steering assist torque generated by the first assist torque command value has been generated, the steering assist torque is generated by the second assist torque command value set by the second torque setting means.

The foregoing arrangements allow an appropriate direction of steering operation to be shown to a driver in advance and correctly, and without impairing safety, and an operation time during collision avoidance to be shortened, and, in particular, an idle running time to be reduced.

In accordance with the foregoing aspects of the present invention, the appropriate direction of steering operation can be shown to the driver in advance and correctly, and without impairing safety, and the operation time during collision avoidance can be shortened, and, in particular, the idle running time can be reduced.

BRIEF DESCRIPTION OF THE DRAWINGS

The present invention will be described hereinafter with reference to the accompanying drawings.

DETAILED DESCRIPTION OF THE PREFERRED EMBODIMENTS

Arrangements and operations of a steering assist system according to a preferred embodiment of the present invention will be described below using FIGS. 1 through 4. An obstacle avoidance assist system avoiding an obstacle present ahead of a vehicle will be described as an example.

An arrangement of a vehicle mounted with the steering assist system according to the preferred embodiment of the present invention will be first described with reference to FIG. 1.

Figure 1:
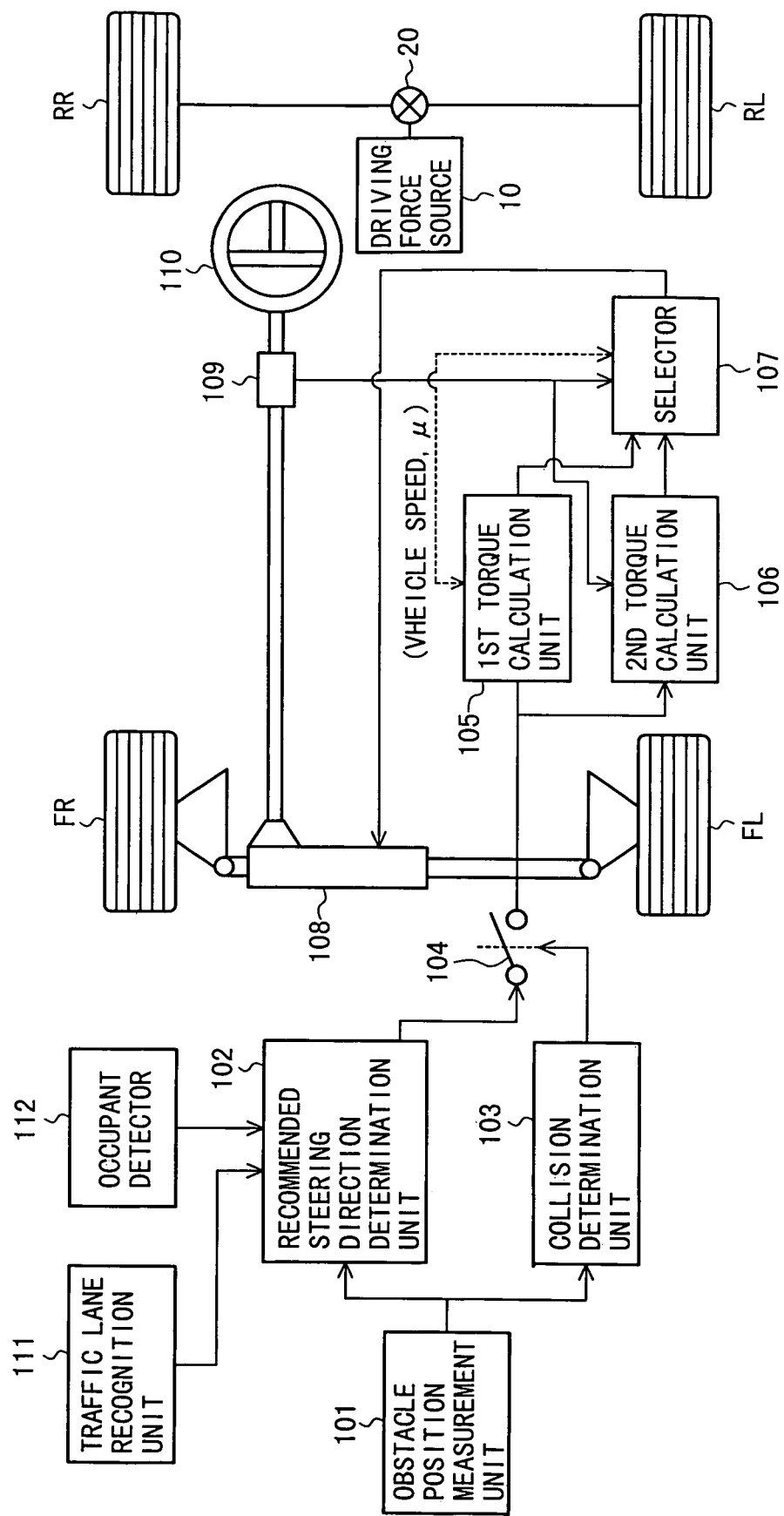
FIG. 1 is a system block diagram showing a vehicle mounted with a steering assist system according to a preferred embodiment of the present invention.

FIG. 1 is a system block diagram showing the vehicle mounted with the steering assist system according to the preferred embodiment of the present invention.

A driving force outputted from a driving force source 10 is distributed to left and right by a differential gear 20 and drives rear wheels RR, RL. Typically, the driving force source 10 is an internal combustion engine or an electric motor. A transmission gear or the like, though not shown in FIG. 1, may be disposed between the driving force source 10 and the differential gear 20. The system shown in FIG. 1 is a rear wheel drive system; however, the driving force source 10 may instead be adapted to drive front wheels FR, FL.

A steering wheel 110 is coupled to the front wheels FR, FL via a steering mechanism steering the front wheels FR, FL. The steering mechanism includes a steering torque assist unit 108 providing steering assist. Typically, the steering torque assist unit 108 can assist in steering torque for a hydraulic cylinder or an electric motor of a power steering system. The steering torque assist unit 108 receives an input of an assist torque command value. The steering torque assist unit 108 generates assist torque to assist in steering such that the assist torque command value inputted thereto is achieved. The steering wheel 110 has a steering post that, in turn, includes a steering torque sensor 109 for detecting steering torque applied to the steering post.

The steering assist system according to the preferred embodiment of the present invention includes an obstacle position measurement unit 101, a recommended steering direction determination unit 102, a collision determination unit 103, a switch 104, a first torque calculation unit 105, a second torque calculation unit 106, and a selector 107. The steering assist system further includes a traffic lane recognition unit 111 and an occupant detector 112.

The obstacle position measurement unit 101 measures a distance from, and a lateral position of, a forward obstacle. Typically, a radar device, such as a laser radar or a milliwave radar, an obstacle detection camera, or the like is used as the obstacle position measurement unit 101. Any other device, as long as it can detect the distance from the obstacle, may instead be used as the obstacle position measurement unit 101. The distance from the forward obstacle measured with the obstacle position measurement unit 101, and a relative speed, which is a derivative of distance with respect to time, are applied to the collision determination unit 103. The lateral position relative to the forward obstacle measured with the obstacle position measurement unit 101 is applied to the recommended steering direction determination unit 102.

The collision determination unit 103 determines risk of collision based on the distance from the forward obstacle measured with the obstacle position measurement unit 101 and the relative speed as the derivative of distance with respect to time. It is to be noted that the risk of collision of the vehicle is high when, for example, time to collision (TTC), which is an allowance of time before the collision occurs if the current relative speed is maintained, becomes lower than a predetermined minimum TTC.

Typically, the recommended steering direction determination unit 102 determines the steering direction based on the lateral position relative to the forward obstacle measured with the obstacle position measurement unit 101. If the forward obstacle is offset to the left relative to a host vehicle, it can generally be considered that the recommended steering direction is to the right. The recommended steering direction is determined as such based on the direction offset relative to the forward obstacle.

The traffic lane recognition unit 111 uses, for example, a camera imaging a forward image of the vehicle to recognize the traffic lane, so that the recognition unit 111 recognizes a specific position in the road on which the host vehicle is running. Based on the information provided by the traffic lane recognition unit 111 on the specific position in the road on which the host vehicle is running, the recommended steering direction determination unit 102 corrects the recommended steering direction. For example, if there is no more traffic lanes on the right so that the host vehicle runs outside the road or into an opposing lane, the recommended steering direction determination unit 102 corrects the recommended steering direction to the left to prevent the host vehicle from running into the opposing lane or allow the host vehicle to avoid collision with a forward obstacle.

The occupant detector 112 uses an occupant detection sensor mounted in a seat to detect, for example, an occupant on a front passenger's seat. Based on the information of whether or not there is, for example, an occupant on the front passenger's seat, as detected by the occupant detector 112, the recommended steering direction determination unit 102 corrects the recommended steering direction to one in which the side of the front passenger's seat is to collide, if collision avoidance is impossible and there is no occupant on the front passenger's seat.

Further, the recommended steering direction determination unit 102 may be arranged not to determine the recommended steering direction, if the relative speed is so high that collision impact can inevitably be large. In such cases, forcing to steer to avoid collision could result in an offset collision, damaging the vehicle severely with reduced safety. In this case, the type of collision is a fully lapped collision, in which the collision occurs at the front of the vehicle. Because of impact absorbing structures and the like involved in late vehicle models, occupants are less protected in frontal collision than in side oblique collision. In such cases, the driver's attention is called to the front of the vehicle by providing torque control, such as by applying vibration to the steering wheel, as a warning against collision.

Determining that the risk of vehicle collision is high, the collision determination unit 103 closes the switch 104, so that the information on the steering direction determined by the recommended steering direction determination unit 102 is transmitted to the first torque calculation unit 105 and the second torque calculation unit 106.

The first torque calculation unit 105 sets a steering assist torque for a period of time that begins when it is determined that the risk of collision is high and ends when the driver actually reacts to start a steering operation. The second torque calculation unit 106 sets a steering assist torque after the driver has actually performed the steering operation. The selector 107 uses an output from the steering torque sensor 109 to determine the start of steering by the driver. Before the start of steering, the selector 107 selects a first assist torque command value set by the first torque calculation unit 105 and outputs the command value to the steering torque assist unit 108. After the steering is started, the selector 107 selects a second assist torque command value set by the second torque calculation unit 106 and outputs the command value to the steering torque assist unit 108.

As a result, when the risk of collision with the forward obstacle becomes high, the steering torque assist unit 108 is controlled such that the steering assist torque is selected according as it is before or after the start of steering by the driver.

Figure 2:
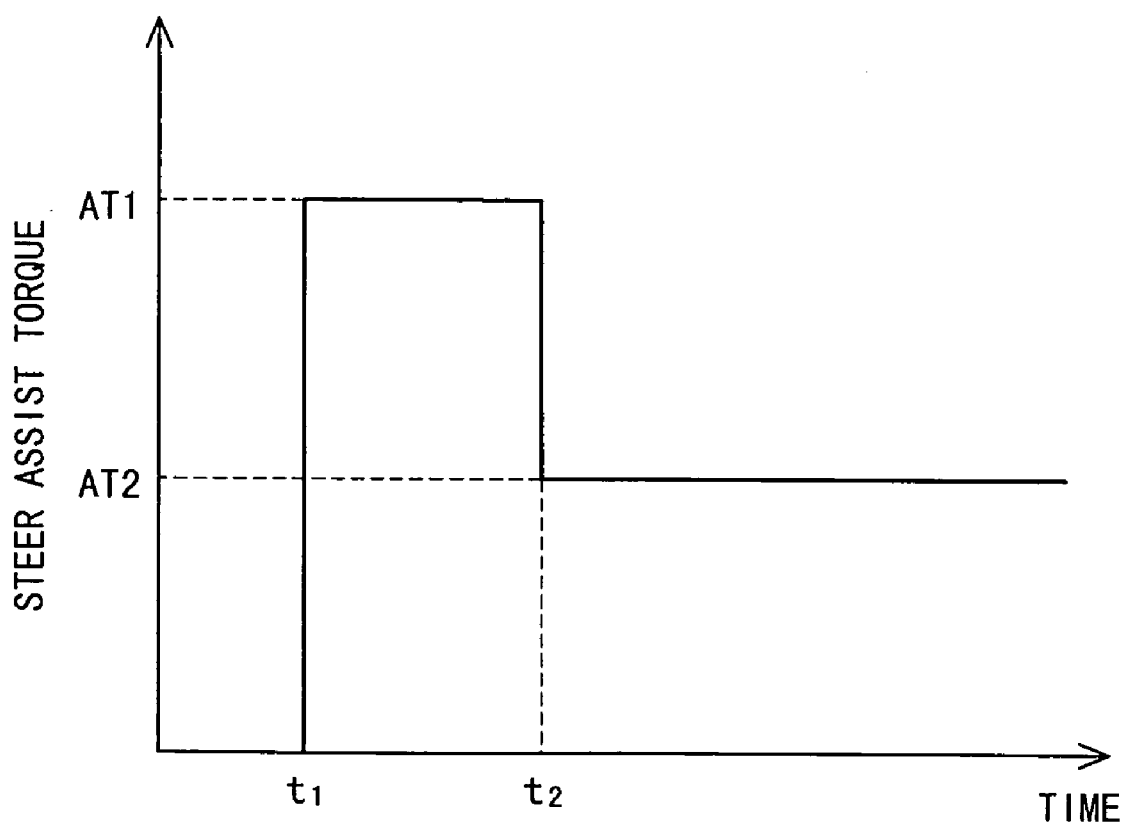
FIG. 2 is a diagram for illustrating assist torque set by a first torque calculation unit and a second torque calculation unit of the steering assist system according to the preferred embodiment of the present invention.
Figure 3:
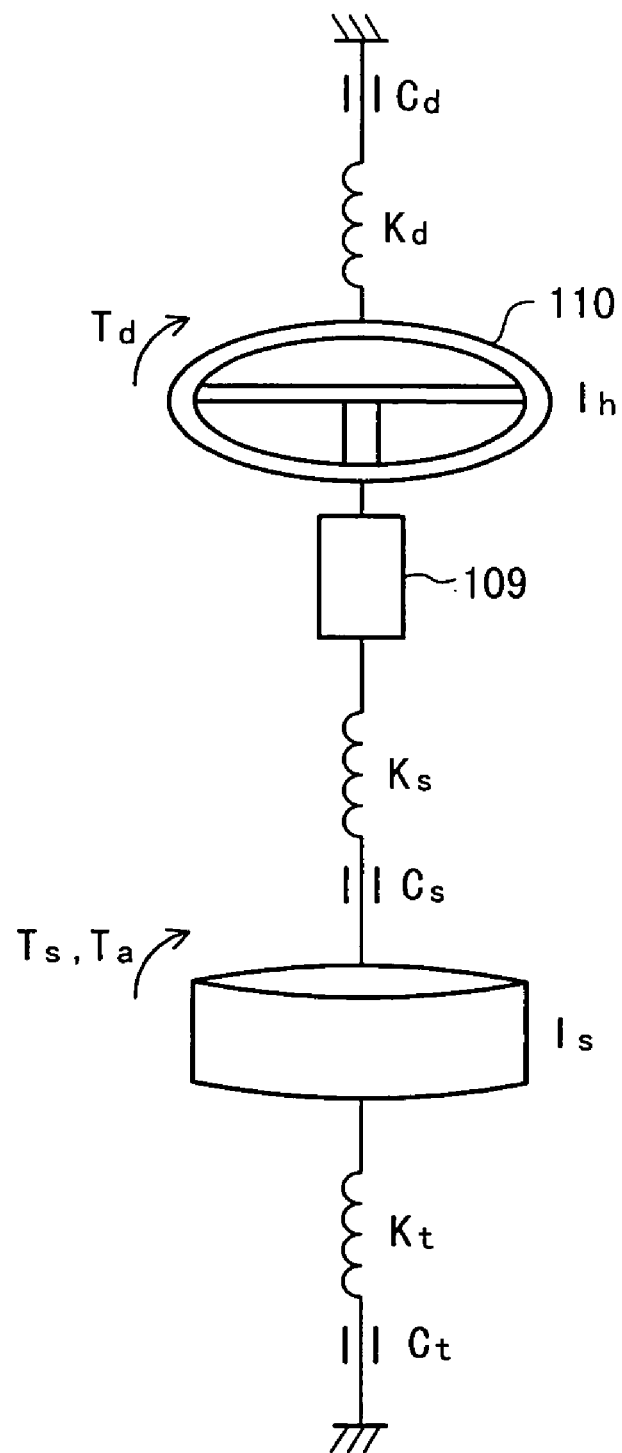
FIG. 3 is a view showing an approximation model of a steering system in the vehicle mounted with the steering assist system according to the preferred embodiment of the present invention.

Referring to FIGS. 2 and 3, the assist torque set by the first torque calculation unit 105 and the second torque calculation unit 106 of the steering assist system according to the preferred embodiment of the present invention will be described below.

FIG. 2 is a diagram for illustrating the assist torque set by the first torque calculation unit 105 and the second torque calculation unit 106 of the steering assist system according to the preferred embodiment of the present invention. In FIG. 2, the abscissa represents time, while the ordinate represents steering assist torque. FIG. 3 is a view showing an approximation model of a steering system in the vehicle mounted with the steering assist system according to the preferred embodiment of the present invention.

FIG. 2 shows the magnitude of the steering torque applied actually to the wheels by the steering assist system according to the preferred embodiment of the present invention. It is assumed that a warning is initiated of a high risk of collision at time t1. At this point in time, the steering torque assist value is a first assist torque setting value AT1 set by the first torque calculation unit 105. It is further assumed that, as time elapses, the driver actually starts the steering at time t2. At time t2, the steering torque assist value is switched to a second assist torque setting value AT2 set by the second torque calculation unit 106. As such, the steering assist torque is switched at timing before and after the start of steering by the driver.

The first assist torque setting value AT1 set by the first torque calculation unit 105 for the period before the steering operation is started will be first described. The first assist torque setting value AT1 represents a magnitude of assist torque applied for a brief period before the driver actually starts steering. This assist torque must ensure that the driver is warned of presence of a forward obstacle and the steering direction recommended for avoiding the obstacle is promptly and correctly transmitted.

The inventors examined subjective rating of the driver by actually applying torque to the steering wheel and found the following. Specifically, a vibratory torque helps remind the driver of an emergency because of its association with vehicle failure, but does not allow the driver to identify the specific direction in which the torque is applied. It is thus determined that, to transmit the direction of torque, it is effective to apply a constant torque with a certain magnitude.

Accordingly, in accordance with the preferred embodiment of the present invention, torque of a magnitude to such an extent that does not largely affect the direction of travel of the vehicle is applied to the steering wheel, so that the steering direction is properly transmitted to the driver. Preferably, the first assist torque setting value AT1 set by the first torque calculation unit 105 should be such that a torque of about 2 Nm to 4 Nm is generated at a steering wheel end.

An advance experiment revealed that time it took the driver to react in emergency steering was around 0.6 seconds on average for a surprise that was unpredictable. A period of time (t2-t1) during which the first assist torque setting value AT1 set by the first torque calculation unit 105 is actually applied is a dead time of about 0.6 seconds, after which the driver actually turns the steering wheel.

Referring to FIG. 3, the approximation model of the steering system in the vehicle will be described below. The steering wheel 110 has an inertia moment Ih and is connected to an inertia moment Is of the steering system via the steering torque sensor 109 of the power steering system and a torsion spring Ks of a steering column. The inertia moment Is of the steering system is a sum of all inertia moments of a rack & pinion, a wheel, and the like. A self-aligning torque Ts is applied to the steering system and the steering system is in contact with the ground via a torsional rigidity Kt of a tire. It is to be noted that a torque Ta is the steering assist torque. If a large steering assist torque Ta is applied by the first torque calculation unit 105, steering is performed in opposition to the inertia moment Is and the tire torsional rigidity Kt. At this point in time, however, the driver is yet to react and the inertia moment Ih of the steering wheel 110 is fixed even by way of a rigidity Kd of an arm of the driver. As a result, a steering angle is limited within a relatively small range. Yaw rate response of the vehicle relative to steering is represented by a secondary delay system. There is only a fairly small change in yaw angle with respect, for example, to a stepwise input for a short period of 0.6 seconds. This should not result in any unstable condition in which the direction of travel is disturbed.

Assume, for example, that an assist torque of 4 Nm is applied for 0.6 seconds to a vehicle with an engine displacement of 2000 cc and a vehicle weight of 1.5 t while the vehicle is running at 60 km/h. In this case, movement distance of the vehicle in the lateral direction is about 10 cm. Even with a vehicle speed of 100 km/h, the movement distance in the lateral direction is about 50 cm. This is not something that makes the vehicle run into an unstable condition, even if the vehicle instantaneously moves about 50 cm. With a vehicle having a small engine displacement and a light weight, however, application of an assist torque of 4 Nm results in an excessively large lateral movement. In such cases, it becomes necessary to reduce the first assist torque setting value AT1. Specifically, the first assist torque setting value AT1 is appropriately selected in a range of 2 to 4 Nm according to the vehicle.

Referring again to the approximation model of the steering system shown in FIG. 3, a steering input torque by the driver is represented by Td. Torque applied as the steering assist torque Ta is transmitted to the steering wheel via the steering column and the steering torque sensor 109. The steering wheel is held by the rigidity Kd of the arm of the driver and the steering torque sensor 109 reads a torque value of the steering assist torque Ta in a steady state.

The driver notices a warning assist torque by the first torque calculation unit 105 to apply the steering input torque Td. Then, the steering wheel is easily turned, so that a sign of the torque measured by the steering torque sensor 109 is inverted, because the inertia moment Ih of the steering wheel 110 is sufficiently smaller than the inertia moment Is of the steering system. This allows determination to be made that the driver has started steering. This, in turn, allows the selector 107 to select, as the steering assist torque, the second assist torque setting value AT2 set by the second torque calculation unit 106.

Referring to FIG. 3, reference numerals Cd, Cs, Ct denote friction damping, respectively.

The start of steering by the driver is detected in the foregoing description. The period of time from a time at which application of the first assist torque setting value AT1 is started (t1) to a time at which application of the second assist torque setting value AT2 is started may instead be set to a constant value. This is because human response in emergencies is about 0.6 seconds with only minimum variations. After the lapse of a predetermined period of time (e.g. 0.6 seconds) from the start of warning, the selector 107 switches the steering assist torque to the second assist torque setting value AT2 set by the second torque calculation unit 106. According to this arrangement, the assist torque application time before the human response remains constant. This makes it easier to determine the magnitude of the assist torque that does not result in the direction of travel of the vehicle not being disturbed, thus achieving greater safety.

In the foregoing description, the first assist torque setting value AT1 set by the first torque calculation unit 105 is constant. The first assist torque setting value AT1 may still be varied according to a running speed of the vehicle (vehicle speed). Damping characteristics of the yaw rate are aggravated as the running speed increases. Accordingly, even with the first assist torque applied for the same period of time, the lateral movement increases. The first assist torque setting value AT1 is therefore reduced as the vehicle running speed increases further. A vehicle having an anti-lock brake system for controlling brakes of four wheels includes a wheel speed sensor that detects a wheel speed of the four wheels, so that the vehicle running speed can be detected. The first torque calculation unit 105 is then adapted to vary the first assist torque setting value AT1 according to the vehicle running speed (vehicle speed) using the vehicle running speed detected by the wheel speed sensor. At high speed running, vehicle stability can be achieved by limiting the steering assist torque.

The first assist torque setting value AT1 set by the first torque calculation unit 105 may also be varied according to a road surface friction coefficient (μ). On a slippery road surface having a low friction coefficient, the yaw damping characteristics are aggravated and the self-aligning torque is also reduced. Accordingly, the steering angle becomes even larger and the vehicle can become more unstable even with the same steering assist torque. The first assist torque setting value AT1 is therefore reduced when the road surface friction coefficient is decreased. The road surface friction coefficient is estimated in a vehicle mounted with a vehicle dynamics control (VDC) system controlling behavior of the vehicle. Using the estimated road surface friction coefficient, accordingly, the first torque calculation unit 105 is adapted to vary the first assist torque setting value AT1 according to the road surface friction coefficient (μ). Vehicle stability can be achieved by limiting the steering assist torque when the vehicle is running on a road surface with a low friction coefficient.

If the first assist torque command value is to be changed to the second assist torque command value after the lapse of a predetermined period of time, the predetermined period of time is varied according to the vehicle running speed (vehicle speed) or the road surface friction coefficient (μ).

The second assist torque setting value AT2 set by the second torque calculation unit 106 for the period after the steering assist operation for danger avoidance is performed will next be described. The second torque calculation unit 106 serves its purpose as long as it can assist the driver in promptly performing operations following his or her notice of the warning to start steering. The second torque calculation unit 106 lightens the steering torque to allow the driver to perform his or her operations promptly. Simply put, a predetermined assist torque is applied so that a steering effort can be lightened.

For the second assist torque setting value AT2 set by the second torque calculation unit 106, a maximum assist can be applied by lightening the steering torque to a value close to zero based on, for example, the value measured by the steering torque sensor 109.

Once avoidance steering has been started, assist torque calculation is switched, for example, from torque control to speed control. One measurement taken of human steering speed reveals that the maximum steering speed is about 300 degrees/second to 500 degrees/second. In emergencies, however, the maximum capacity cannot be exhibited, resulting in a reduced steering speed. Speed control is therefore provided such that the steering wheel is turned at, for example, 300 degrees/second to 500 degrees/second in the direction, in which the driver turns the steering wheel, thereby achieving the maximum capacity of the driver. In this case, an upper limit value is provided for the assist torque and the speed control is disabled as soon as the driver stops turning the steering wheel. If, for example, the driver turns the steering wheel in an opposite direction while the speed control is being provided, a reduced steering speed results. The speed control then attempts to increase the steering speed further, which results in an increased assist torque. If the assist torque becomes excessively large, the assist torque hampers an attempt of the driver to turn the steering wheel in the opposite direction. Accordingly, the second assist torque setting value AT2 is limited to a maximum value that does not hamper steering wheel operation performed by the driver.

In addition, an assist torque that applies vibration to the steering wheel is set so as to issue a warning if the driver attempts to turn the steering wheel in the direction opposite the recommended steering direction. If the driver does not operate the steering wheel, the steering assist is limited to a light one, thereby prompting the driver to continue effecting avoidance.

Specific details of assist torque control operations for performed by the steering assist system according to the preferred embodiment of the present invention will be described below with reference to FIG. 4.

Figure 4:
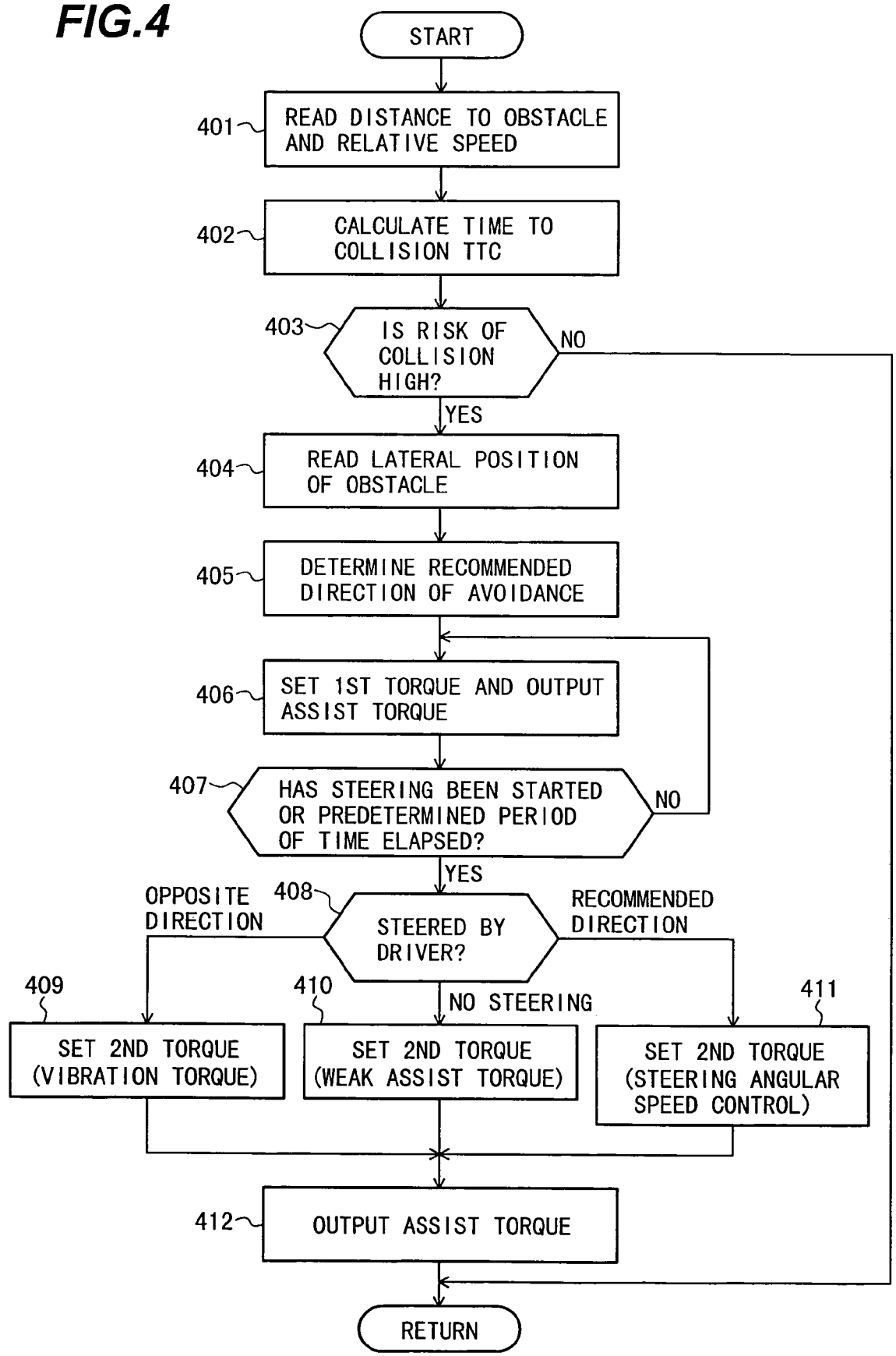
FIG. 4 is a flowchart showing details of control provided for assist torque of the steering assist system according to the preferred embodiment of the present invention.

FIG. 4 is a flowchart showing the details of control provided for assist torque of the steering assist system according to the preferred embodiment of the present invention.

In step 401, the collision determination unit 103 reads the distance from the forward obstacle measured by the obstacle position measurement unit 101 and the relative speed, which is the derivative of distance with respect to time.

In step 402, the collision determination unit 103 calculates the time to collision (TTC), which is an allowance of time before the collision occurs if the current relative speed is maintained.

In step 402, the collision determination unit 103 determines the risk of collision using the time to collision (TTC). If the risk of vehicle collision is low, the operation is terminated. If the risk of vehicle collision is high, the switch 104 is turned ON and the operation proceeds to step 404.

In step 404, the recommended steering direction determination unit 102 reads the lateral position relative to the forward obstacle measured by the obstacle position measurement unit 101.

In step 405, the recommended steering direction determination unit 102 determines the recommended steering direction based on the lateral position relative to the forward obstacle read therein.

In step 406, the first torque calculation unit 105 sets the steering assist torque for the period of time that begins when it is determined that the risk of collision is high and ends when the driver actually reacts to start a steering operation and outputs the assist torque command value.

In step 407, the selector 107 determines the start of steering by the driver based on the output from the steering torque sensor 109. Before the start of steering, step 406 is repeated and the selector 107 selects the first assist torque command value set by the first torque calculation unit 105 and outputs the command value to the steering torque assist unit 108. In addition, the selector 107 monitors the lapse of a predetermined period of time (e.g. 0.6 seconds) and, until the predetermined period of time elapses, repeats step 406 to select the first assist torque command value set by the first torque calculation unit 105 and outputs the command value to the steering torque assist unit 108.

When the steering is started or the predetermined period of time elapses, the operation proceeds to step 408, in which the steering direction or whether the steering is performed or not is determined.

If the steering direction is opposite, the second torque calculation unit 106 sets a command value applying vibration as the second assist torque command value in step 409. The second torque calculation unit 106 then outputs the command value to the steering torque assist unit 108 via the selector 107.

If the steering is not started despite the lapse of the predetermined period of time, the second torque calculation unit 106 sets a command value applying a weak assist torque as the second assist torque command value in step 410. The second torque calculation unit 106 then outputs the command value to the steering torque assist unit 108 via the selector 107.

If the steering direction is as recommended, the second torque calculation unit 106 selects the steering angular speed control and produces an output to the steering torque assist unit 108 via the selector 107 in step 410.

As described in the foregoing, in the steering assist system according to the preferred embodiment of the present invention, the risk of collision and the recommended steering direction are determined based on the position of the obstacle ahead of the host vehicle and, by applying, for example, a large torque as an assist torque before the driver actually starts his or her steering operation, the recommended steering direction determined by the system can be clearly shown to the driver. After the driver has positively started the steering operation in the recommended steering direction, the assist torque is switched to an appropriate one as selected according to the condition, so that the steering direction can be clearly shown to the driver and, at the same time, vehicle stability can be ensured and unpleasant sensation the driver would otherwise have can be reduced.

The best mode for carrying out the present invention has been described with reference to the preferred embodiment. The present invention is not intended to be limited to the above-referenced embodiment, and accordingly it will be understood that variations and modifications can be effected within the spirit and scope of the invention.

What is claimed is:

1. A steering assist system determining a steering direction according to a vehicle running condition and generating an assist torque for a steering operation, the steering assist system comprising:

an obstacle position measurement means for measuring a distance from, and a lateral position of, a forward obstacle;

a collision determination means for determining risk of collision based on measurements of the distance from, and the lateral position of, the forward obstacle taken with the obstacle position measurement means;

a recommended steering direction determination means for determining a recommended steering direction based on the measurements of the lateral position of the forward obstacle taken with the obstacle position measurement means;

a first torque setting means for setting a first assist torque command value;

a second torque setting means for setting a second assist torque command value that is smaller than the first assist torque command value set by the first torque setting means; and a selection means for selecting such that, after the collision determination means determines that the risk of collision is high, a steering assist torque is generated by the first assist torque command value set by the first torque setting means and, after a predetermined period of time elapses after a driver has started steering or the steering assist torque generated by the first assist torque command value has been generated, the steering assist torque is generated by the second assist torque command value set by the second torque setting means.

2. The steering assist system according to claim 1, wherein the first torque setting means limits a magnitude of the first assist torque command value to be set thereby such that a change in a direction of travel of a vehicle body falls within a specified range.

3. The steering assist system according to claim 1, wherein, when the selection means changes the first assist torque command value to the second assist torque command value after the lapse of the predetermined period of time, the predetermined period of time is set so as to substantially equal to an idle running time by a human response lag.

4. The steering assist system according to claim 3, wherein the selection means limits the predetermined period of time such that a change in the direction of travel of the vehicle body falls within a specified range.

5. The steering assist system according to claim 1, wherein the first torque setting means varies the magnitude of the first assist torque command value to be set thereby according to a running speed of the vehicle.

6. The steering assist system according to claim 1, wherein the first torque setting means varies the magnitude of the first assist torque command value to be set thereby according to a friction coefficient of a road surface on which the vehicle runs.

7. The steering assist system according to claim 1, wherein the second torque setting means calculates a magnitude of the second assist torque to be set thereby through angular velocity control of a steering angle.

8. The steering assist system according to claim 1, further comprising:
a traffic lane recognition means for recognizing a traffic lane forward of the vehicle body,
wherein the recommended steering direction determination means corrects the recommended steering direction based on information on a running position within a road of a host vehicle provided by the traffic lane recognition means.

9. The steering assist system according to claim 1, further comprising:
an occupant detection means for detecting an occupant other than the driver,
wherein the recommended steering direction determination means corrects the recommended steering direction based on whether or not there is an occupant other than the driver as detected by the occupant detection means.

10. A vehicle having wheels driven by a driving force source and a steering assist system determining a steering direction according to a running condition of the vehicle and generating an assist torque for a steering operation, the steering assist system comprising:
an obstacle position measurement means for measuring a distance from, and a lateral position of, a forward obstacle;
a collision determination means for determining risk of collision based on measurements of the distance from, and the lateral position of, the forward obstacle taken with the obstacle position measurement means;
a recommended steering direction determination means for determining a recommended steering direction based on the measurements of the lateral position of the forward obstacle taken with the obstacle position measurement means;
a first torque setting means for setting a first assist torque command value;
a second torque setting means for setting a second assist torque command value that is smaller than the first assist torque command value set by the first torque setting means; and
a selection means for selecting such that, after the collision determination means determines that the risk of collision is high, a steering assist torque is generated by the first assist torque command value set by the first torque setting means and, after a predetermined period of time elapses after a driver has started steering or the steering assist torque generated by the first assist torque command value has been generated, the steering assist torque is generated by the second assist torque command value set by the second torque setting means.

* * * * *